(12) United States Patent
Kim

(10) Patent No.: US 10,747,176 B2
(45) Date of Patent: Aug. 18, 2020

(54) SYSTEM AND METHOD FOR 3D HOLOGRAPHIC DISPLAY USING SPATIAL-DIVISION MULTIPLEXED DIFFRACTIVE OPTICAL ELEMENTS FOR VIEWING ZONE IMPROVEMENT

(71) Applicant: ELECTRONICS AND TELECOMMUNICATIONS RESEARCH INSTITUTE, Daejeon (KR)

(72) Inventor: Hyun Eui Kim, Cheongju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 135 days.

(21) Appl. No.: 16/121,505

(22) Filed: Sep. 4, 2018

(65) Prior Publication Data

US 2019/0072899 A1 Mar. 7, 2019

(30) Foreign Application Priority Data

Sep. 4, 2017 (KR) ........................ 10-2017-0112825
Sep. 3, 2018 (KR) ........................ 10-2018-0104668

(51) Int. Cl.
*G03H 1/22* (2006.01)
*G02B 30/26* (2020.01)
(Continued)

(52) U.S. Cl.
CPC ........... *G03H 1/2205* (2013.01); *G02B 30/26* (2020.01); *G03H 1/2294* (2013.01); *G02B 5/188* (2013.01);
(Continued)

(58) Field of Classification Search
CPC .. G03H 1/2205; G03H 1/2294; G03H 1/0244; G03H 1/0248; G03H 1/30;
(Continued)

(56) References Cited

U.S. PATENT DOCUMENTS

| 9,658,378 B2 | 5/2017 | Song et al. |
| 2015/0234350 A1 | 8/2015 | Park et al. |

(Continued)

FOREIGN PATENT DOCUMENTS

| KR | 10-2014-0114651 A | 9/2014 |
| KR | 10-2015-0021017 A | 2/2015 |

OTHER PUBLICATIONS

David Fattal et al., "A multi-directional backlight for a wide-angle, glasses-free three-dimensional display", Macmillan Publishers Limited., Mar. 21, 2013, pp. 348-351.

*Primary Examiner* — Wen Huang

(57) ABSTRACT

In the present invention, by providing a 3D holographic display system comprising a modulation apparatus configured to modulate light emitted from a light source into a light wave corresponding to a 3D image, an optical apparatus configured to propagate the light wave into the first plane, and a diffraction apparatus configured to multiplex the propagated light wave to extend viewing angle of the 3D holographic display, a limited viewing zone of the holographic display determined by the SLM pixel pitch, may be extended by optical methods, such as using diffractive optical elements (DOE) for spatial-division multiplexing (SDM).

11 Claims, 6 Drawing Sheets

(51) Int. Cl.
  *G02B 5/18* (2006.01)
  *G03H 1/30* (2006.01)
  *G03H 1/02* (2006.01)

(52) U.S. Cl.
  CPC ......... *G03H 1/0244* (2013.01); *G03H 1/0248* (2013.01); *G03H 1/30* (2013.01); *G03H 2001/2207* (2013.01); *G03H 2001/2239* (2013.01); *G03H 2223/23* (2013.01)

(58) Field of Classification Search
  CPC ... G03H 2001/2207; G03H 2001/2239; G03H 2223/23; G02B 30/26; G02B 30/27; G02B 5/188
  See application file for complete search history.

(56) References Cited

U.S. PATENT DOCUMENTS

| | | | |
|---|---|---|---|
| 2016/0033706 A1 | 2/2016 | Fattal et al. | |
| 2017/0060088 A1 | 3/2017 | Kim et al. | |
| 2018/0284466 A1* | 10/2018 | Moebius | G02B 5/32 |

\* cited by examiner

SYSTEM AND METHOD FOR 3D HOLOGRAPHIC DISPLAY USING SPATIAL-DIVISION MULTIPLEXED DIFFRACTIVE OPTICAL ELEMENTS FOR VIEWING ZONE IMPROVEMENT

CROSS-REFERENCE TO RELATED APPLICATION

This application claims priority to and the benefit of Korean Patent Application Nos. 10-2017-0112825 and 10-2018-0104668 filed in the Korean Intellectual Property Office on Sep. 4, 2017 and Sep. 3, 2018, respectively, the entire contents of which are incorporated herein by reference.

BACKGROUND OF THE INVENTION

(a) Field of the Invention

The present invention relates to a 3D holographic display system and method for extending a limited viewing zone of a holographic display through spatial-division multiplexing using a DOE.

(b) Description of the Related Art

The holographic display includes at least one SLM (spatial light modulator) that modulates the amplitude or phase of the incident interference light. Depending on the modulation scheme, the SLM may be defined as Electrically Addressed Spatial Light Modulators (EASLMs), Optically Addressed Spatial Light Modulators (OASLMs), Electro-optic SLMs (EOSLMs), Acousto-optic SLMs. EASLM is a liquid crystal panel based structure widely used for 2D displays and is frequently used for light wave modulation for holographic imaging.

DOE (DOE, diffractive optical element) is a device that changes the phase or intensity characteristic of a propagated light by using light diffraction. It is possible to replace conventional reflector optical device and refraction optical device, and it is used for portable image device, HUD or digital camera which requires small or thin device because mass production and integration of device is easy.

Holographic optical elements (HOEs) are a type of DOE that is fabricated by recording interference fringes on a photosensitive material using an interference system.

On the other hand, the viewing angle of the holographic display is limited. If the holographic display consists of a holographic display with a periodically located pixel of the holographic display, the viewing angle θ may be calculated using the equation $\theta = 2\sin^{-1}(\lambda/2p)$ according to SLM pixel pitch (pitch) p and wavelength λ of incident light. Therefore, a holographic display requires a very high resolution panel with a dense pixel pitch of a sub-micrometer unit to have a viewing angle comparable to a conventional 2D display. There are limitations in improving SLM performance based on existing flat panel display technology, and technologies are being developed to improve display performance through time multiplexing and spatial multiplexing.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention are provided to enhance the performance of a 3D holographic display by locating a DOE and spatial multiplexing to extend a viewing zone.

An exemplary embodiment of the present invention provides 3D holographic display system comprising a modulation apparatus configured to modulate light emitted from a light source into a light wave corresponding to a 3D image; an optical apparatus configured to propagate the light wave into the first plane; and a diffraction apparatus configured to multiplex the propagated light wave to extend viewing angle of the 3D holographic display.

The diffraction apparatus includes a diffraction pattern of resolution higher than pixel pitch of the modulation apparatus.

The diffraction pattern deflects propagation direction of the propagated light wave.

The diffraction apparatus includes a plurality of partial lattices composed of some of the diffraction patterns, each of the plurality of partial lattices is mapped to each of a plurality of SLM image pixel groups formed by the light wave on the first plane, and deflects the propagation direction of the light wave propagated to each of the plurality of SLM image pixel group.

The diffraction apparatus includes a diffraction unit including at least one partial lattice among the plurality of partial lattices, and the diffraction unit deflects propagation direction of the light wave propagated on the at least one SLM image pixel group mapped to the at least one partial lattice into a predetermined area.

The diffraction unit propagates the propagated light wave to predetermined one view point in the at least one SLM image pixel group.

The diffraction unit changes the diffraction angle of the light wave propagated into the at least one SLM image pixel group to a predetermined angle.

The diffraction apparatus is produced by a volume hologram method using a holographic optical device (HOE).

An exemplary embodiment of the present invention provides 3D holographic display system comprising a SLM configured to modulate light into a light wave; a spatial filter configured to remove noise from the light wave; an optical apparatus configured to propagate the light wave; and a DOE (diffractive optical unit) configured to multiplex the propagated light wave.

The DOE deflects propagation direction of the propagated light wave.

The DOE consists of transparent material or reflective material.

The optical apparatus is a telescope optical apparatus or projection optical apparatus.

The optical apparatus propagates the noise-removed light wave on a SLM image plane, the DOE includes a plurality of partial lattices, and each of the a plurality of partial lattice is mapped to a SLM image pixel group including a plurality of SLM image pixels formed by the light wave on the SLM image plane, and deflects propagation direction of the light wave propagated to the SLM image plane into a specific direction.

The DOE includes a diffraction unit that includes some partial lattices of the plurality of partial lattices, and the diffraction unit deflects the propagation direction of some light waves propagated to some SLM image pixel groups mapped to the some partial lattices into a predetermined area.

The diffraction unit propagates the propagation direction of the some light waves propagated to the some SLM image pixel group mapped to the some partial lattice to a predetermined viewing zone.

The SLM modulates the light into a light wave that includes information about the image corresponding to the view point in the predetermined viewing zone.

The diffraction unit changes diffraction angle of the some light waves propagated to the some SLM image pixel groups mapped to the some partial lattices to a predetermined angle.

Each of the partial lattices is mapped to a plurality of SLM image pixels continuously positioned on the SLM image plane.

Each of diffraction unit contains a plurality of partial lattices irregularly located among the plurality of partial lattices.

An exemplary embodiment of the present invention provides 3D holographic display method comprising modulating parallel light into a 3D image; propagating the modulated light wave; and spatially multiplexing the propagated light wave to change propagation direction of the propagated light wave.

DETAILED DESCRIPTION OF THE EMBODIMENTS

Figure 1:
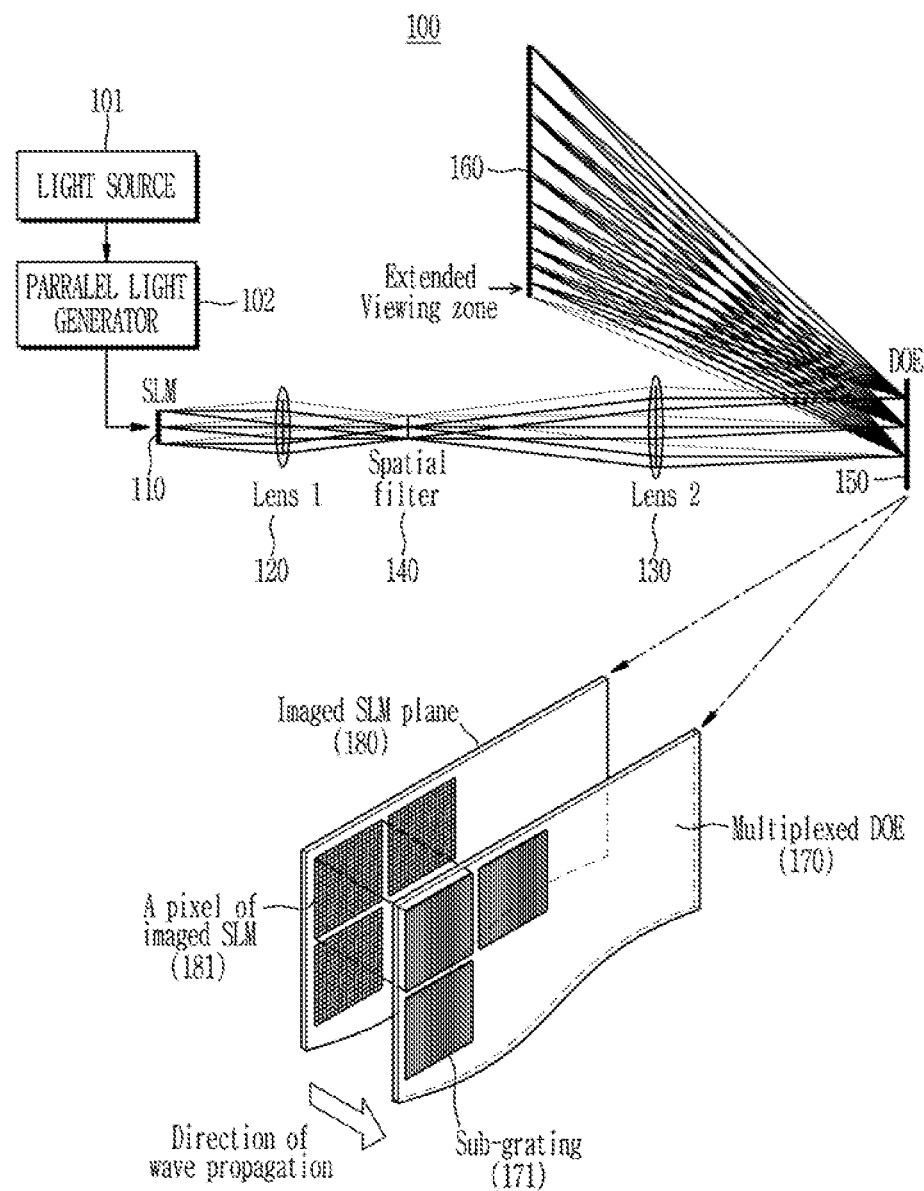
FIG. 1 shows a 3D holographic display system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a 3D holographic display system according to an exemplary embodiment of the present invention.

A 3D holographic display system 100 according to an exemplary embodiment of the present invention may include a light source 101, a parallel light generator 102, a SLM 110, a relay optical apparatus 120 and 130, a spatial filter 140, and a DOE 150 and 170.

The light source 101 may emit interference light, and the parallel light generator 102 may arrange the light of emit light from a light source into a parallel light.

The SLM 110 may diffract the light arrange by modulating the light arranged by the parallel light generator 102 into a light wave for reproducing hologram image.

A relay optical apparatus (for example, 4F relay optics) may propagate a light wave into a specific plane in the form of a light wave front so that the hologram image is reproduced by extending, reducing or maintaining the magnification of the light wave. For example, a relay optical apparatus may include a telescope optic that includes at least one lens. The relay optical apparatus propagates the light wave front on a specific plane, and the SLM image plane 180 may be defined as the specific plane in which the light wave is propagated.

A spatial filter (SF) 140 is located in the focal plane of the lens included in the relay optical apparatus, and removes DC (direct current) component of the light wave, the high order component of the light wave and conjugate component of the light wave.

The DOE 150 and 170 is located in the SLM image plane (180, image plane) where the light wave front is propagated through the relay optical apparatus. The diffractive optical element (DOE) 150 and 170 deflects the propagation direction of the light wave to the extended viewing zone and propagates the light wave to the extended viewing zone by spatially multiplexing the light wave propagated on the SLM image plane 180 through the relay optical apparatus.

DOE 150 and 170 may include optical components and devices (e.g., surface-relief DOEs or HOEs) for spatially multiplexing light waves. DOE 150 and 170 may be produced by a deposition-etching method which is deposited and etched on a transparent substrate, but in the case of deposition-etching, various noise (DC component, conjugate component, high order components) occurs, which may cause crosstalk in the entire 3D holographic display system. Accordingly, instead of the deposition-etching method, a holographic optical element (HOE) having a volume hologram (interference hologram) may be manufactured using the interference system to produce DOE 150 and 170.

DOE 150 and 170 may be composed of reflect DOE or transparent DOE depending on the purpose of display. When making DOEs with transparent materials, the 3D holographic display system may operate as a see-through display.

DOE 150 and 170 may include a plurality of partial lattices (for example, sub gratings). At this time, one partial lattice 171 may be mapped to a plurality of SLM image pixels 181 of the SLM image plane (image plane 180). For example, a partial lattice 171 may deflect the propagation direction of a propagated light wave into a plurality of SLM image pixel groups mapped to a partial lattice.

In each partial lattice 171, diffraction patterns (or lattice patterns) of various types (e.g., period) may be formed. The diffraction pattern formed at each partial lattice 171 may deflect the propagation direction of the light wave propagated to each SLM image pixel to a specific direction. To deflect the propagation direction of the light wave in a specific direction, the resolution of the diffraction pattern may be less than the resolution of the SLM 110. Thus, each partial lattice 171 further extends the diffraction angle of the light wave propagated from the SLM 110 to the SLM image pixel 181 of the SLM image plane 180, allowing the light wave to be interfered at a shorter distance from the SLM image plane, and the hologram image may be reproduced at a location more adjacent to the SLM image plane 180.

DOE 150 and 170 may include at least one DOE unit. The DOE unit consists of a plurality of partial lattices 171 and performs specific optical functions. The DOE unit may include a partial lattice, a plurality of partial lattices, a plurality of adjacent partial lattices, or a plurality of partial lattices.

The characteristic of the DOE unit may vary according to the located order of the partial lattice included in the DOE unit. When a plurality of partial lattices discrete in a regular order are included in one DOE unit, a noise of a high order due to the interference of the light wave occurs in the viewing zone formed by the DOE unit, so by disposing the partial lattice in irregular order in the unit, noise may be reduced.

The optical function performed by the DOE unit may be a lens function or prism of the stock, and the configuration of the 3D holographic display system may be changed according to a predetermined function in the individual DOE unit. For example, each DOE unit may have different hologram images reproduced by light waves diffracted by each lattice device mapped to each DOE unit.

Figure 2:
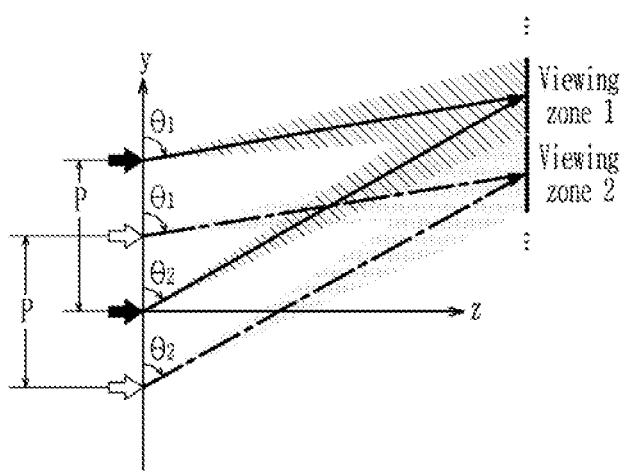
FIG. 2 shows an exemplary embodiment of the present invention in which each DOE unit propagates a light wave to an arbitrary viewing zone.

FIG. 2 shows an exemplary embodiment of the present invention in which each DOE unit propagates a light wave to an arbitrary viewing zone.

The DOE units included in the DOE 150 and 170 described in FIG. 1 may multiplex the propagated light wave propagated to the SLM image plane 180 or multiplex the propagation direction of the light wave, so the viewing zone is extended accordingly. That is, as disclosed in FIG. 2, the DOE 150 and 170 may multiplex the light wave to propagate the light wave to a plurality of viewing zones (viewing zones 1 and 2).

As shown in FIG. 2, DOE unit may include two or more partial lattices separated by p, and may deflect propagation direction of light wave by each partial lattice to generate light wave with specific view point (or spatial pixel, voxel (volume pixel)) may be propagated. Each partial lattice included by each DOE unit may deflect the propagation direction of propagated light wave propagated to a plurality of SLM image pixels 181 mapped to each partial lattice to different angles $\theta_1$ and $\theta_2$ and propagate to one view point.

For example, the first DOE unit deflects the propagation direction of the first light wave and the third light wave propagated to the SLM image pixel mapped to the first partial lattice and the third partial lattice included in the first DOE unit, so the first DOE may propagate the first light wave and the third light wave to a plurality of viewpoints (voxels) included in first viewing zone (viewing zone 1) accordingly. For example, the second DOE unit deflects the propagation direction of the second light wave and the fourth light wave (dotted line) propagated to the SLM image pixel mapped to the second partial lattice and the fourth partial lattice included in the second DOE unit, so the first DOE may propagate the second light wave and the fourth light wave to a plurality of viewpoints included in viewing zone 2.

If each SLM image pixel 181 mapped to each partial lattice that constitutes a DOE unit is located independently or discretely, it is impossible to express the high frequency pattern (fringe) constituting the hologram image, so the viewing angle of the 3D holographic display system is reduced by narrowing the diffraction angle. To solve this problem, it is possible to set up a plurality of SLM image pixels to locate each partial lattice of the DOE unit.

In addition, by continuously mapping a plurality of SLM image pixels (181) to one partial lattice, a plurality of continuous signal components are propagated in a plane, it is possible to maintain the inherent periodicity defined by the physical pixel pitch between the pixels of the SLM 110, so the viewing zone width generated by each DOE unit may have the same width as the viewing zone generated by modulating the SLM 110 before the multiplex using the DOE accordingly.

For example, the viewing zone of a 3D holographic display structure using a normal view window system has the same width as each viewing zone generated by each partial lattice mapped to each DOE unit in a multiplexed 3D holographic display using the DOEs 150 and 170 of FIG. 2 according to an embodiment of the present invention.

Thus, by setting the location of the view point corresponding to each DOE unit so that a plurality of viewing zones are continuously located, a viewing angle that is wider than the viewing angle formed based on the physical performance of the SLM 110 may be obtained.

At this time, if the SLM image pixel 181 corresponding to each DOE unit reproduces a hologram image corresponding to the parallax at the view points in the extended viewing zone where light waves propagate by each DOE unit, the user may observe the hologram reproduce image and full-parallax in the extended viewing zone.

For example, the SLM 110 may modulate a light generated by a light source into a light wave that includes information about the hologram image corresponding to the parallax at the view points within each extended viewing zone.

The viewing zone is extended by a multiple of the degree of multiplexing for each axis direction, i.e., the DOE unit for each axis of the DOE 150 and 170. For example, FIG. 2, DOE 150 and 170 are composed of two DOE units in the y axis direction, the viewing zone of the hologram image by the 3D holographic display is extended by 2 times in the y axis direction.

Figure 3:
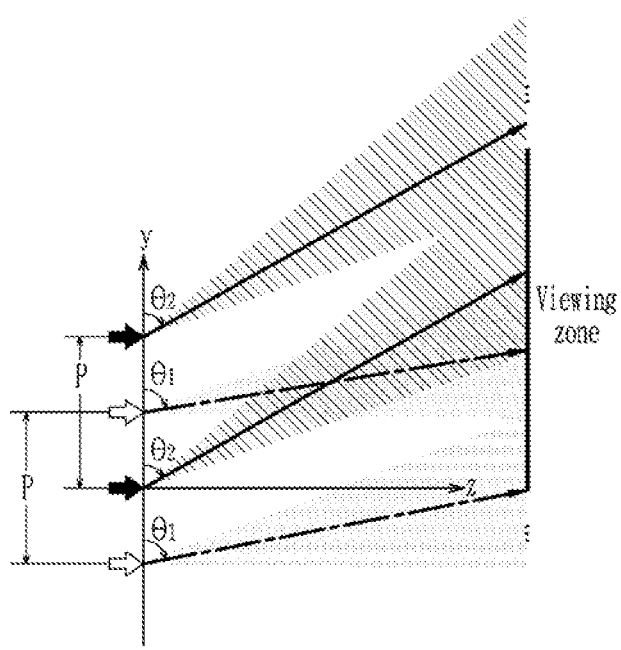
FIG. 3 shows the process of deflecting the propagation direction of a light wave by an arbitrary angle of each DOE unit according to an exemplary embodiment of the present invention.

FIG. 3 shows the process of deflecting the propagation direction of a light wave by an arbitrary angle of each DOE unit according to an exemplary embodiment of the present invention.

The DOE units included in the DOE 150 and 170 disclosed in FIG. 1 multiplex the propagated light wave to the SLM image plane, so the viewing zone is extended accordingly, as disclosed in FIG. 3. That is, the DOE 150 and 170 may generate extended viewing zone (viewing zone) by multiplexing the light wave, as disclosed in FIG. 3.

As shown in FIG. 3, each DOE unit may deflect the propagation direction of the propagated light wave to specific angles $\theta_1$ and $\theta_2$ to a plurality of SLM image pixels mapped to each DOE unit. For example, the first DOE unit changes the diffraction angle of the propagated first light wave (thick solid line) to the first angle $\theta_2$, the second DOE unit changes the diffraction angle of the propagated second light wave (dotted line) to the second angle $\theta_1$, so the DOEs can deflect the propagation direction of the light wave propagated from a plurality of SLM image pixels into the extended viewing zone accordingly.

In this case, since the DOE units reconstruct the hologram image by deflecting the propagation direction of the light wave into the diffraction angles $\theta_1$ and $\theta_2$ redetermined on each of the DOE units, the maximum viewing angle of the holographic display defined by the diffraction angle of the SLM 110 is redefined as the maximum deflection angle of the DOE unit.

Figure 4:
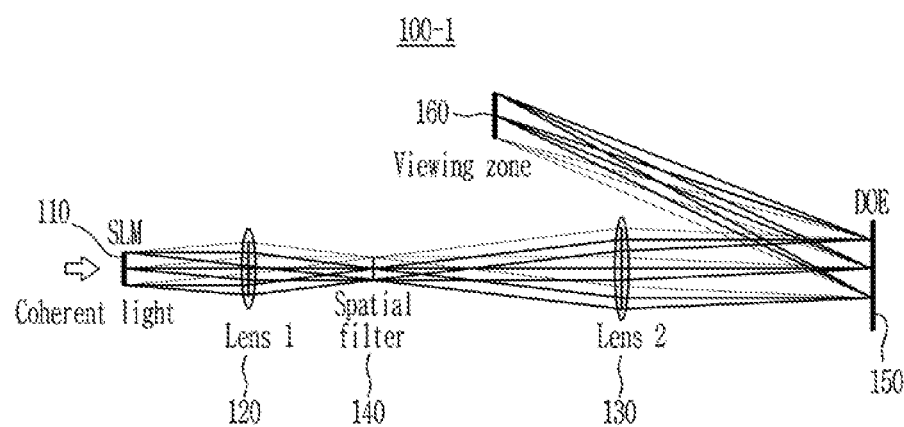
FIG. 4 shows a 3D holographic display system of a relay type according to an exemplary embodiment of the present invention.
Figure 5:
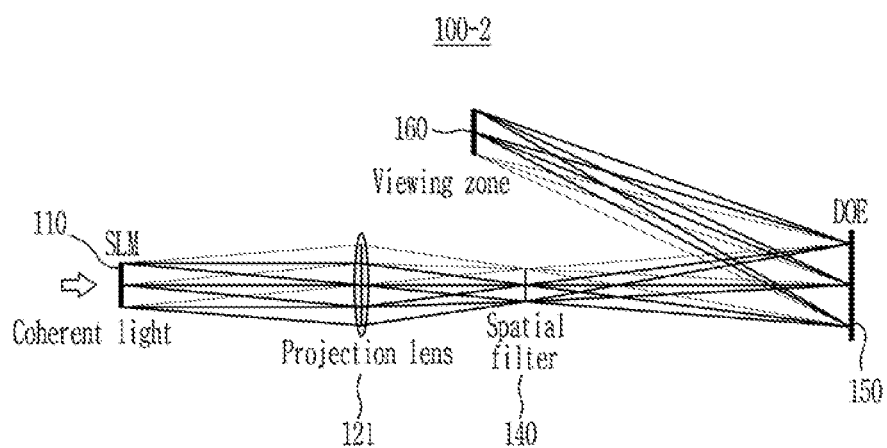
FIG. 5 shows a 3D holographic display system with a projection scheme according to an exemplary embodiment of the present invention.

FIG. 4 shows a 3D holographic display system of a relay type according to an exemplary embodiment of the present invention, and FIG. 5 shows a 3D holographic display system with a projection scheme according to an exemplary embodiment of the present invention.

As shown in FIG. 4, the relay optical apparatus may include a first lens 120 and a second lens 130. If the relay optical apparatus includes a first lens (lens 1, 120) and a second lens (lens 2, 130), the extending rate of the light wave may be a focal length ratio f1:f2, which is the ratio between the focal length f1 of the first lens 120 and the focal length f2 of the second lens 130.

The SLM image pixel size re-imaged in the focal plane of the second lens (lens 2, 130) is proportional to the focal length ratio. The diffraction angle of the relay optical apparatus is inversely proportional to the focal length ratio. Therefore, it is possible to extend the viewing angle by adjusting the focal length ratio of the two lenses of the relay optical apparatus so as to reduce the SLM image pixel size and increase the diffraction angle.

As shown in FIG. 5, the relay optical apparatus may be replaced with a one projection lens (projection lens) 121.

If one projection lens 121 is substituted for the relay optical apparatus, the SLM image pixel size is determined by the thin lens equation 1/d+1/i=1/f (where d is the distance between the projection lens 121 and the object SLM 110, i is the projection lens 121 SLM image plane 180, and f is the distance between the projection lens 121 and the focal point).

In the two DOE unit configurations described through FIG. 4 and FIG. 5, each DOE unit serves as one stock lens. Since the pattern interval of the diffraction pattern constituting each partial lattice is narrower than the SLM image pixel interval, it is possible to broaden the width of the propagated light wave from the SLM 110, and a light wave propagated at each SLM image pixel 181 by each DOE unit is interfered at a closer distance than when the DOE is not disposed as in the prior art, and the hologram image is reproduced at a location closer to SLM 110 than of the prior art accordingly.

Figure 6:
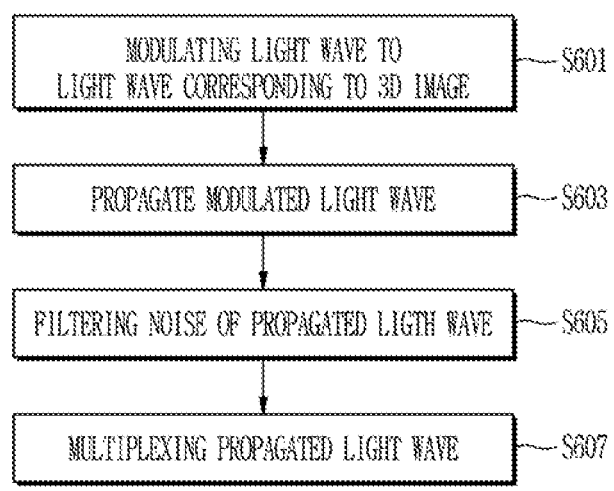
FIG. 6 shows a flowchart illustrating a 3D holographic display method according to an exemplary embodiment of the present invention.

FIG. 6 shows a flowchart illustrating a 3D holographic display method according to an exemplary embodiment of the present invention.

As shown in FIG. 6, an exemplary embodiment of the present invention includes a step S601 to a step S605.

In step S601, SLM of 3D holographic display system (for example, holographic display system 100 of FIG. 1) may modulate a light generated by a light source and arranged in parallel by a parallel light generator into a light wave for reproducing a 3D holographic image. For example, the SLM of the 3D holographic display system 100 may modulate the hologram input data generated using the parallel light into a light wave corresponding to a 3D image to be reproduced.

In step S603, the 3D holographic display system 100 may propagate a light wave (or light wave front) into specific 3D space. For example, a 3D holographic display system 100 may propagate a light wave into a 3D space using an optical apparatus including two lenses or one lens.

In step S605, the 3D holographic display system 100 may remove the noise of the light wave. For example, the 3D holographic display system 100 may remove DC components, conjugate components, or high order components of the light wave.

In step S607, the 3D holographic display system 100 may multiplex the propagated light wave (or the propagation direction of the light wave). For example, the DOE of the 3D holographic display system 100 is arranged on the SLM image plane where the light wave front generated by the SLM is propagated, so the diffraction angle of the light wave may be changed by spatial multiplexing the light wave propagated at the first angle into the SLM image plane.

According to an exemplary embodiment of the present invention, a limited viewing zone of the holographic display determined by the SLM pixel pitch, may be extended by optical methods, such as using diffractive optical elements (DOE) for spatial-division multiplexing (SDM).

In addition, according to an exemplary embodiment of the present invention, when reproducing a hologram having a corresponding parallax through SLM image pixels corresponding to each extended viewing zone, the user may observe a reconstructed hologram image having a full parallax (full parallax) in the entire extended viewing zone.

Also, according to an exemplary embodiment of the present invention, the resolution of the diffraction pattern of each partial lattice (sub grating) of the DOE is higher than that of the SLM, so that the diffraction angle of the light wave becomes larger, and the hologram image is reproduced at a closer location to the SLM image plane.

In addition, according to an exemplary embodiment of the present invention, the DOE is made of a transparent material to be applied to functions as a see-through display, and a display for augmented reality, a holographic scheme such as head-mounted displays (HMDs) and head-up displays (HUDs), and projection displays (projection displays).

Although the present invention has been described in detail in the foregoing specification, the scope of the present invention is not limited to the embodiments. For example, in the foregoing description, various variations and modifications of the art also belong to the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A 3D holographic display system, comprising:
a SLM (spatial light modulator) configured to modulate light into a light wave;
a spatial filter configured to remove noise from the light wave;
an optical apparatus configured to propagate the light wave; and
a DOE (diffractive optical unit) configured to multiplex the propagated light wave.

2. The system of claim 1, wherein:
the DOE deflects propagation direction of the propagated light wave.

3. The system of claim 1, wherein:
the DOE consists of transparent material or reflective material.

4. The system of claim 1, wherein:
the optical apparatus is a telescope optical apparatus or projection optical apparatus.

5. The system of claim 1, wherein:
the optical apparatus propagates the noise-removed light wave on a SLM image plane,
the DOE includes a plurality of partial lattices, and
each of the a plurality of partial lattice is mapped to a SLM image pixel group including a plurality of SLM image pixels formed by the light wave on the SLM image plane, and deflects propagation direction of the light wave propagated to the SLM image plane into a specific direction.

6. The system of claim 5, wherein:
the DOE includes a diffraction unit that includes some partial lattices of the plurality of partial lattices, and the diffraction unit deflects the propagation direction of some light waves propagated to some SLM image pixel groups mapped to the some partial lattices into a predetermined area.

7. The system of claim 6, wherein:
the diffraction unit propagates the propagation direction of the some light waves propagated to the some SLM image pixel group mapped to the some partial lattice to a predetermined viewing zone.

8. The system of claim 7, wherein:
the SLM modulates the light into a light wave that includes information about the image corresponding to the view point in the predetermined viewing zone.

9. The system of claim 6, wherein:
the diffraction unit changes diffraction angle of the some light waves propagated to the some SLM image pixel groups mapped to the some partial lattices to a predetermined angle.

10. The system of claim 6, wherein:
each of the partial lattices is mapped to a plurality of SLM image pixels continuously positioned on the SLM image plane.

11. The system of claim 7 or claim 8, wherein:
each of diffraction unit contains a plurality of partial lattices irregularly located among the plurality of partial lattices.

* * * * *